United States Patent [19]

Krofchak

[11] Patent Number: 5,439,505

[45] Date of Patent: Aug. 8, 1995

[54] TREATMENT OF STEEL MILL WASTE FOR RECYCLING

[76] Inventor: David Krofchak, 256 Bronte Rd., Oakville, Ontario, Canada, L6L 3C6

[21] Appl. No.: 327,761

[22] Filed: Oct. 24, 1994

[51] Int. Cl.⁶ .............................................. C22B 1/243
[52] U.S. Cl. .................................. 75/773; 75/961; 75/962; 75/319
[58] Field of Search .................. 75/773, 961, 962, 319

[56] References Cited

U.S. PATENT DOCUMENTS

| | | | |
|---|---|---|---|
| 4,119,455 | 10/1978 | Cass et al. | 75/773 |
| 4,216,012 | 8/1980 | Krofchak | 75/101 R |
| 4,229,295 | 10/1980 | Krofchak | 210/723 |
| 4,279,635 | 7/1981 | Krofchak | 71/42 |
| 4,404,105 | 9/1983 | Rysman de Lockerente et al. | 210/710 |

*Primary Examiner*—Melvyn Andrews
*Attorney, Agent, or Firm*—Rogers & Scott

[57] ABSTRACT

Steel mill waste containing iron, iron oxides and polluting compounds are treated with a strong alkali to raise the Ph to 14 to allow more alkali to solubilize silica. The mixture of materials and silica gels is then reacted with alkaline silicic compounds and allowed to cure and form hard sedimentary rock-like materials, solidified into a non-polluting solid which can be recycled in a steel-making furnace to produce iron and non-polluting slag.

10 Claims, No Drawings

TREATMENT OF STEEL MILL WASTE FOR RECYCLING

FIELD OF THE INVENTION

This invention relates to the treatment of steel mill waste for the production of secondary material suitable for feeding to steel-making furnaces.

BACKGROUND TO THE INVENTION

The steel industry produces more waste materials than any other manufacturing business. For example, approximately 120 million tons of steel per year are produced in North America. This, in turn, produces about 12 million tons of waste in the form of slag, dust, mill scale, grindings, shot dust, metallic slag fines, sludges, etc. Over half of this is slag which is recycled into aggregates and road materials. The remainder comprises mainly iron oxide. By recycling such waste for metal recovery, it may be reclassified as secondary material.

Over the last 30 years, the manufacturing sector has been called up to comply with ever more stringent environmental standards. The dusts and sludges are particularly polluted with heavy metals such as lead, zinc, cadmium, chromium, nickel, etc. as a result of processing contaminated scrap metal. Consequently, they have been classified as hazardous.

Numerous processes have been developed to treat and recycle steel mill secondary materials and waste but have fallen short of being a comprehensive solution because they only deal with some of the waste and also are very costly. Some of these processes use plasma arc furnaces, briquetting machines and pelletizing systems.

It is an object of this invention to provide a process for treating steel mill waste inexpensively in one system and producing a product that can be stored safely on site as a non-polluting secondary material suitable for recycling in various furnaces such as electric arc furnaces, basic oxygen furnaces and blast furnaces.

SUMMARY OF THE INVENTION

According to the invention, there is provided a method of treating steel mill waste containing mixtures of metals and metal oxides which includes reacting the mixtures with a soluble alkali in an amount sufficient to raise the Ph to 14 and to solubilize fine silica particles forming part of the mill waste to soluble silicates and silica gels. The soluble silicates and silica are intimately mixed with the steel mill waste thereby forming a metallic silicate matrix with the unstable polluting heavy metals such as lead, zinc, cadmium, chromium, metal, etc. This produces an inert mixture to which is added silicic compounds which solidify the mixture into a hard, solid rock-like material which, if desired, may be used in a variety of ways: for example, as landfill, dyke construction, road base, but more particularly as an iron-rich feedstock for metal recovery in furnaces.

The soluble alkali may be caustic soda, or a mixture of sodium carbonate and lime which results in the in situ formation of caustic soda (sodium hydroxide).

The silicic compounds may be selected from finely ground steel slag (i.e., calcium silicates) and tri-calcium aluminum silicate (cement). The silicic compound may be a mixture of calcium silicate and calcium aluminum silicate.

Many types of steel-making dusts, sludges and secondary materials may be mixed together in ratios compatible with the formation of pyrometallurgical compounds acceptable as furnace feedstock to supplement iron ores and scrap metal.

Typically, steel mill waste may contain approximately 8–12% weight carbon dust and about 1 to 10% weight silica. More specifically, such waste may contain 10 to 80% weight iron oxides, 1 to 65% weight carbon and 1 to 10% weight silica.

The amount of alkali required depends on the nature of the steel-making waste, particularly the unstable polluting dusts, and is determined by trial and experiment in any particular instance. Usually, the amount of alkali required will be in the range of 0.1% to about 5% by weight.

The alkali and steel-making waste is mixed together by a simple heavy-duty type of mixing apparatus which will be selected according to the nature and stiffness of the mix, and the best apparatus to be used in any particular case will be readily apparent to a person skilled in the art.

The amount of silicic compound required depends on the required setting time and, in particular, the required hardness desired for the end use. Usually, the amount of silicic compounds ranges from 1% to 20% by weight. The amount of silicic compound required is determined by trial and experiment and is mixed into the prepared mixture as previously described for the alkali additions.

Usually, large batches of materials can be completed within 30 minutes to two hours and the new material is laid out to set and harden. This is usually well advanced within 24 hours and the solidified material can be used within 10 to 40 days for its end use.

Specific examples of the invention will now be described.

EXAMPLE 1

Steel mill waste including dusts and sludges were obtained from an integrated steel company which operated blast furnaces (BF) and basic oxygen furnaces (BOF). These materials were: BOF dust, BF dust, mill scale, ore pellet fines, BF kish (metallic slag fines), carbon dust and lime dust.

The following initial mixture was made up:

| | |
|---|---|
| 10% weight: | BOF dust (containing silica $S_iO_2$) |
| 10% weight: | BF dust (containing silica $S_iO_2$) |
| 15% weight: | ore pellet fines |
| 25% weight: | mill scale ($Fe_3O_4$) |
| 15% weight: | kish |
| 10% weight: | carbon dust (top dust from BF), and coke fines used to reduce oxides to iron 5% weight:waste lime dust. (This eliminates the need to add lime). |
| 9% weight: | fine ground blast furnace slag (calcium silicate) comprising the silicic compound. |
| 1% weight: | sodium carbonate to create strong alkali (sodium hydroxide) from the lime dust. |
| 91% | |

The initial blend comprised sufficient water to make a combination that was mixable to dissolve and disperse the alkali.

After thorough mixing, 9% by weight fine ground blast furnace slag (calcium silicate) comprising the silicic compound, was added and mixed. The mixture noticeably started to stiffen and it was then placed on the ground to await completion of the reaction and hardening.

The material was hard within 24 hours and a penetrometer reading indicated it was over 1,000 psi. After ten days, the material was broken up to load into a furnace and heated to a temperature above the melting point of steel. Examination of a cooled sample showed that the material had reduced itself to steel and slag.

An unmelted sample was leached with distilled water after the sample had cured for 10 days and an analysis of the water showed that the pH had dropped to 9 indicating that the alkali had reacted with the silicates. Chromium, lead and cadmium values were all below 0.1 ppm, well below the recommended Regulatory Limits of 1 to 5 ppm.

EXAMPLE 2

Steel mill waste including bag house dusts were obtained from a ferrous scrap steel minimill which operated electric arc furnaces (EAF). These materials were EAF bag house dust, mill scale and metal grinding dust.

An initial mixture was made up comprising the following:

| | |
|---|---|
| 10% weight: | carbon |
| 10% weight: | EAF bag house dust (containing metal oxides and silica) |
| 15% weight: | metal griding dust |
| 50% weight: | mill scales ($Fe_3O_4$) |
| 5% weight: | reagents (1% weight sodium carbonate and 4% weight lime) |
| 90% | |

The materials were mixed together with the 1% sodium carbonate and lime with sufficient water to make a wet, mixable, mortar-like consistency (the pH was 14).

10% by weight of silicic compound in the form of fine ground slag, calcium silicate, was then mixed into the batch. Before the mixture became too stiff to mix further, it was poured out onto the ground to set, harden and cure. After 20 days, it was broken up and fed into an electric furnace and it was reported that it was consumed without any difficulties in the production of steel and slag.

EXAMPLE 3

Samples of waste materials were obtained from a specialty steel mill that produces stainless steel from scrap steels in an electric arc furnace (EAF). These materials were bag house dust and mill scale.

The bag house dust and mill scale contained valuable amounts of chromium, nickel and molybdenum along with the usual iron oxides, lead, cadmium, zinc and silica.

An initial mixture of these materials was made up comprising the following:

| | |
|---|---|
| 10% weight: | carbon |
| 20% weight: | EAF dust (contains metal oxides including silica) |
| 55% weight: | mill scale ($Fe_3O_4$) |
| 6% weight: | reagents comprising 2% sodium carbonate (soda ash) and 4% calcium oxide (lime) |
| 91% | |

The materials were mixed together with the soda ash and lime and water to make a flowable wet mix. 9% ground BF slag, comprising calcium silicate, was then mixed in. When thoroughly mixed, and before setting started, the batch was dumped on the ground to harden. After several weeks, the material was broken up (it tested over 1,500 psi) and was used as feedstock to the furnace to recover the metal values.

Numerous other experiments have been conducted using varying amounts of dusts and waste materials and the results have all been essentially the same, although wide variances in setting times and hardness have been experienced.

The method according to this invention advantageously makes use of a variety of steel mill waste products and consolidates such waste into an environmentally safe and stable product which has significant structural integrity suitable for disposal or for recycling to supplement raw materials fed to steel-making furnaces.

It will be understood that several variations may be made to the above-described exemplary processes, the scope of the invention being defined in the appended claims.

I claim:

1. A method of treating steel mill waste containing iron oxides, and silica, comprising reacting the said steel mill waste with a strong alkali solution in an amount sufficient to raise the pH to 14 and to solubilize silica to form soluble silicate compounds and silica gels, thereby producing a chemically reactive mixture;

and reacting said mixture with silicic compounds to produce a solid, stable, and non-polluting material.

2. A method according to claim 1, wherein the strong alkali is sodium hydroxide.

3. A method according to claim 1, wherein the strong alkali is produced by reacting sodium carbonate with calcium oxide in situ.

4. A method according to claim 1, wherein the silicic compound is ground blast furnace slag comprising calcium silicate.

5. A method according to claim 1, wherein the silicic compound is a mixture of calcium silicate and calcium aluminum silicate.

6. A method according to claim 1, wherein the silicic compound is calcium aluminum silicate.

7. A method according to claim 1 in which the steel mill waste comprises approximately 8-12% weight carbon dust, and about 1 to 10% weight silica.

8. A method according to claim 7 in which the alkali added to the steel mill waste comprises about 0.1% to 5% weight sodium carbonate.

9. A method according to claim 7 in which the silicic compound added to the reactive mixture comprises about 1 to 20% by weight calcium silicate.

10. A method of treating steel mill waste containing 10 to 80% weight iron oxides, 1 to 65% weight carbon, 1 to 10% weight silica, comprising reacting the said steel mill waste with 0.1 to 5% by weight sodium carbonate to produce a strong alkali solution and 3 to 6% weight lime having a pH of 14 sufficient to solubilize silica to form soluble silicate compounds and silica gels, thereby producing a chemically reactive mixture; reacting said mixture with 1 to 20% by weight fine ground slag comprising calcium silicate to produce a solid, stable, and non-polluting material.

* * * * *